June 7, 1955 D. M. LEHMER 2,710,144
LUMBER STOP AND COUNTER
Filed Dec. 5, 1952 2 Sheets-Sheet 1
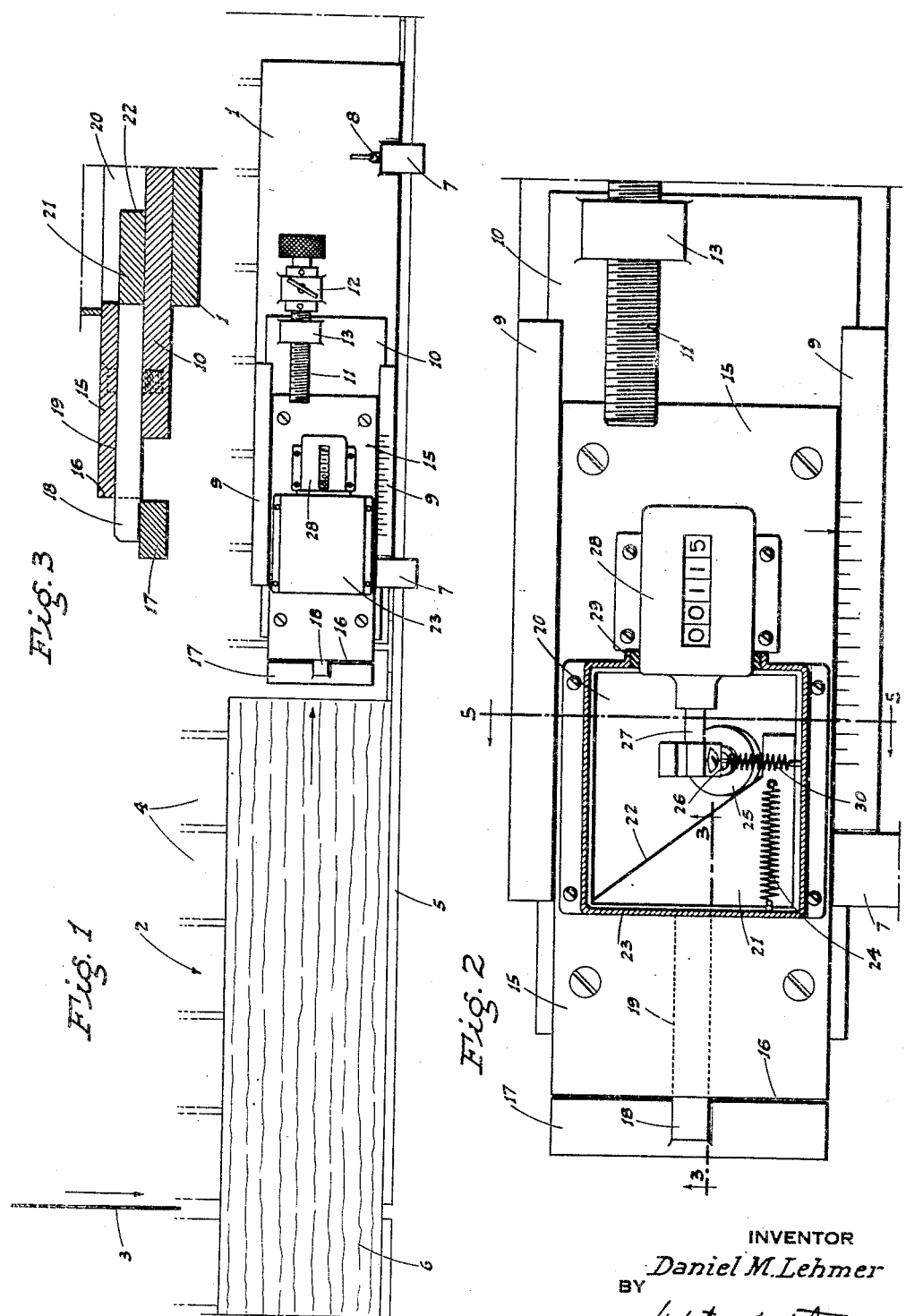
INVENTOR
*Daniel M. Lehmer*
BY
ATTYS June 7, 1955
D. M. LEHMER
2,710,144
LUMBER STOP AND COUNTER
Filed Dec. 5, 1952
2 Sheets-Sheet 2
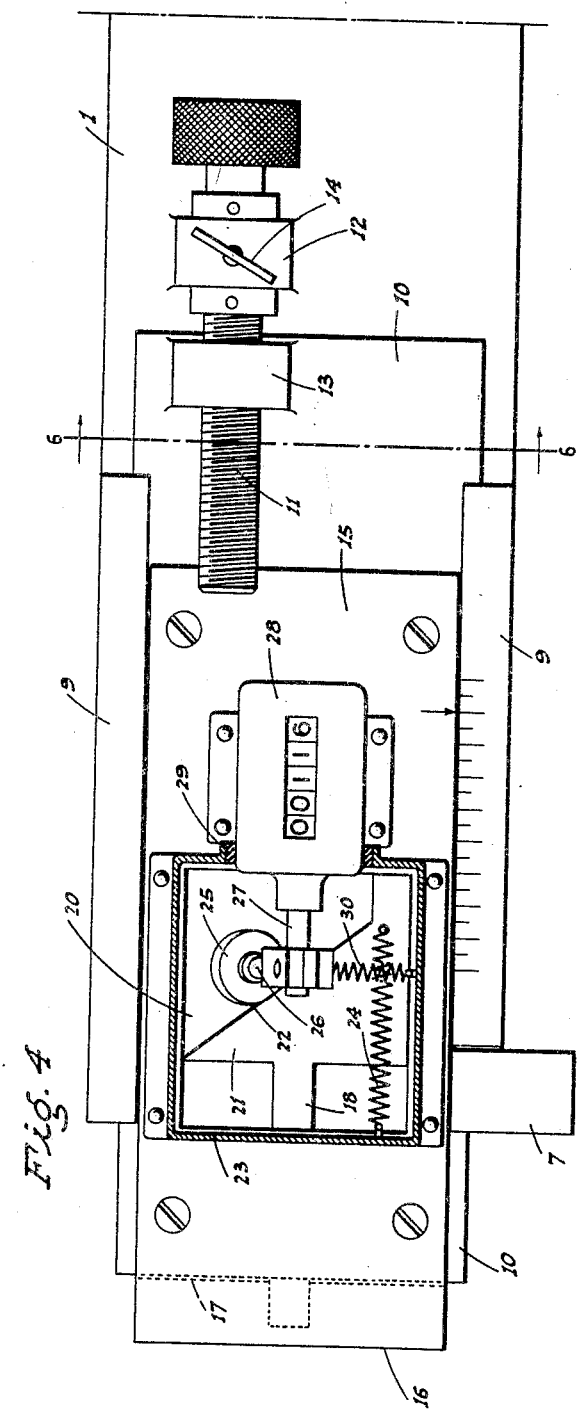
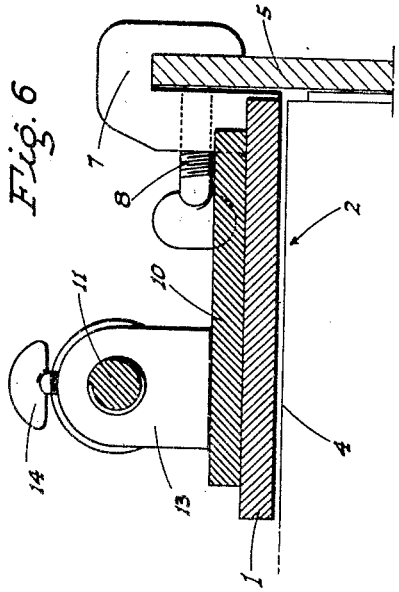
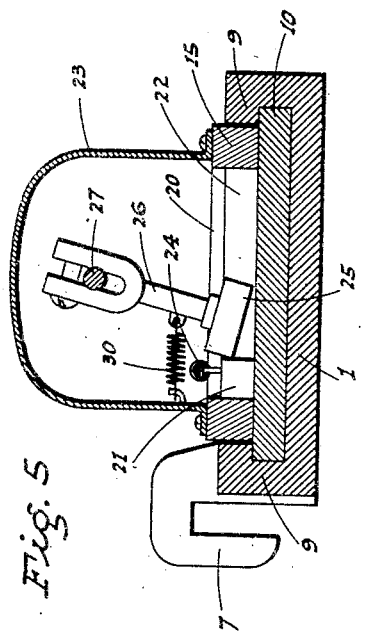
INVENTOR
*Daniel M. Lehmer*
BY
*Webster & Webster*
ATTYS

United States Patent Office 2,710,144
Patented June 7, 1955

2,710,144

LUMBER STOP AND COUNTER

Daniel M. Lehmer, Woodland, Calif.

Application December 5, 1952, Serial No. 324,195

3 Claims. (Cl. 235—91)

This invention relates to a device for use in the wood cutting art, and which is of particular value in the building industry, as in a planing mill, in which a relatively large number of pieces of lumber of the same length are cut either for use in a specific building being erected, or when making up a stock of pieces of the same length.

The device is usable in connection with a lumber table or conveyor with which a transversely movable cut-off saw is associated; the major object being to provide a device which, when attached in the proper position to such conveyor or table, will serve as a stop for one end of a piece of lumber to be cut off by the saw and which includes means functioning, when the stop is used, to count or add up the number of pieces successively stop-engaged and cut off by the saw.

The saw is ordinarily mounted in a longitudinally fixed position relative to the table or conveyor, and a further object of my invention is to arrange the device so that it may be adjusted as a unit along the conveyor for major length adjustments, and is also provided with means to enable minor or close adjustments for lumber lengths to be separately made without shifting the whole device.

Still another object of the invention is to provide a lumber stop and counter which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 1 is a plan view of the device as mounted on a lumber supporting conveyor or table.

Fig. 2 is a fragmentary enlarged plan of the device with the movable counter actuating unit in its normal or inoperative position, the protecting housing being shown in section.

Fig. 3 is a fragmentary longitudinal section on line 3—3 of Fig. 2.

Fig. 4 is a view similar to Fig. 2, but showing the counter actuating unit in its advanced or operating position.

Fig. 5 is a cross section on line 5—5 of Fig. 2.

Fig. 6 is a cross section on line 6—6 of Fig. 4.

Referring now more particularly to the characters of reference on the drawings, the device comprises an elongated base plate 1 adapted to be adjustably mounted on a saw table or conveyor, indicated generally at 2, and beyond the transversely reciprocable cut-off saw 3 which is mounted in connection with the table.

In the present instance, the table is shown as comprising transversely extending lumber supporting rollers 4 mounted at their outer end—opposite the saw—in an upstanding longitudinal bar 5 which projects above the rollers and forms a stop for the outer side edge of the lengths of lumber 6 being cut.

The bar 5 is also employed as a means to support plate 1 above and clear of rollers 4; the outer edge of the plate being provided with rigid longitudinally spaced inverted U-shaped brackets 7 which straddle and slidably seat on the bar from above and one of which is provided with a clamping screw 8 adapted to engage the bar and prevent movement of the base plate 1 along said bar.

The base plate 1 is provided with upstanding longitudinal guide rails 9 along the forward portion of its sides in which a secondary plate 10 is slidable. Such sliding movement is limited and controlled by a longitudinally extending adjustment screw 11 turnably mounted and held against axial movement in a boss 12 upstanding from the plate 1 rearwardly of plate 10, and threaded through an alined boss 13 on the plate 10 adjacent its rear end. Rotation of screw 11 one way or the other, therefore, will cause plate 10 to be moved back and forth on plate 1.

To prevent possible rotative creeping of the screw, a set screw 14 is mounted in boss 12 to clamp against the screw 11.

Superimposed and fixed on plate 10 is an upper plate 15, terminating at its rear end clear of boss 13, but projecting ahead of or overhanging plate 10 (and plate 1) some distance, and its forward edge 16 forming a lumber stop extending transversely of table 2.

Normally disposed ahead of and just below plate 15 is a lumber-engaging cross bar 17 whose width (which is lengthwise of the tables and plates) relative to the overhang of plate 15 is such that said cross bar may be moved back and under plate 15 so that the forward edge of said bar is flush with edge 16.

Rigid with the cross bar is a stem 18, non-turnable but slidable in a slot 19 formed in the plate 15 and which terminates in an enlarged opening 20 in said plate.

Slidable in the opening and attached to the rear end of stem 18 is a cam block 21 having a rearwardly facing diagonaled cam edge 22. A housing 23 is mounted over the opening 20 to keep sawdust, etc. out, and a spring 24 between block 21 and the housing yieldably holds said block, and the cross bar 17, in its forward position, as shown in Fig. 2.

Bearing against the cam face 22 is a free turning roller 25 mounted on the lower end of an arm 26 depending from and clamped to the oscillating axial actuating shaft 27 of a conventional two-stroke cycle counter 28 which is mounted on plate 15 and projecting rearwardly from the housing 23, the rear wall of which has a seal 29 engaging about the counter. A spring 30 between the arm 26 and housing 24 yieldably holds the arm so that shaft 27 is disposed at one end of its actuating stroke.

The cam edge 22 is disposed relative to its longitudinal travel as determined by the movement of bar 17 from its advanced position to one under plate 15, so that with such travel the roller 25 is shifted transversely to rotate shaft 27 sufficient to actuate the counter mechanism; the spring 30 returning the stem to its initial position to complete the counter actuation when cross bar 17 and cam block 21 are pulled forward by spring 24.

In operation, the device is set—by initial adjustment of the device, as a whole, along the lumber stop bar 5, and if necessary a subsequent fine adjustment of plate 10 along plate 1—so as to dispose the edge 16 a distance from the path of movement of the saw such that a piece of lumber, when disposed against the stop edge 16 and cut through by the saw, will be the desired length. With each such movement of a piece of lumber against the rigid stop edge 16, the movable cross bar 17 is, of course, first engaged by the lumber and moved rearwardly so as to actuate the counter through the first stroke of its two-stroke cycle.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A lumber stop and counter comprising a plate unit, means to mount the unit on a lumber cutting table a selected distance lengthwise from the lumber cut-off saw, a rigid stop at the forward end of the plate unit disposed for engagement by one end of a piece of lumber to be cut by the saw, a cross bar disposed normally ahead of the stop and mounted for rearward movement by the lumber before and until engagement of the latter with the stop, a counter mounted on the plate unit back from the cross bar, said counter including a rotary actuating shaft, and a mechanism between the cross bar and shaft to rotate the latter in a counter actuating direction upon rearward movement of the cross bar; said last named means comprising a stem rigid with and projecting rearwardly from the cross bar, means on the plate unit slidably guiding the stem for movement lengthwise of said unit, a cam block on the rear end of the stem, said block having a cam edge, a depending arm projecting radially from the counter shaft, the latter extending lengthwise of the direction of movement of the stem, and a roller on the outer edge of the arm and engaging said cam edge, the latter being arranged relative to the roller and counter shaft so that with rearward movement of the cam block the roller and arm will be swung in one direction to rotate the shaft sufficient to actuate the counter.

2. A lumber stop and counter comprising a plate unit, means to mount the unit on a lumber cutting table a selected distance lengthwise from the lumber cut-off saw, a rigid stop at the forward end of the plate unit disposed for engagement by one end of a piece of lumber to be cut by the saw, a member positioned to be engaged and moved toward the stop by said end of the piece of lumber before the latter is engaged with the stop, and a counter mounted on the plate unit and actuated upon such movement of the member; the lumber cutting table including a longitudinal lumber-stop bar; the plate unit including a lower plate having one side edge extending alongside the bar, inverted U-shaped brackets on the plate adjacent said edge and overhanging the bar, and a set screw mounted in one bracket to clamp against the bar.

3. A lumber stop and counter comprising a plate unit, means to mount the unit on a lumber cutting table a selected distance lengthwise from the lumber cut-off saw, a rigid stop at the forward end of the plate unit disposed for engagement by one end of a piece of lumber to be cut by the saw, a member positioned to be engaged and moved toward the stop by said end of the piece of lumber before the latter is engaged with the stop, and a counter mounted on the plate unit and actuated upon such movement of the member; the plate unit comprising a lower plate and an upper plate slidably supported on the lower plate for movement lengthwise thereof, and on which the stop and counter are mounted, the lower plate extending back from the upper plate, longitudinally alined bosses on the upper plate and on the lower plate back of the upper plate, and an adjustment screw projecting through the bosses and threaded through one boss and held against axial movement in the other boss.

References Cited in the file of this patent

UNITED STATES PATENTS

| | | |
|---|---|---|
| 846,153 | Souther | Mar. 5, 1907 |
| 1,294,700 | Peterson | Feb. 18, 1919 |
| 1,981,231 | Grant | Nov. 20, 1934 |
| 2,048,192 | Marston | July 21, 1936 |